(12) United States Patent
May et al.

(10) Patent No.: US 7,535,287 B2
(45) Date of Patent: May 19, 2009

(54) SEMICONDUCTOR DEVICE AND SYSTEM AND METHOD OF CRYSTAL SHARING

(75) Inventors: Michael R. May, Austin, TX (US); Marcus William May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 429 days.

(21) Appl. No.: 11/446,612

(22) Filed: Jun. 5, 2006

(65) Prior Publication Data
US 2007/0279027 A1    Dec. 6, 2007

(51) Int. Cl.
*G05F 1/10*    (2006.01)
*G06F 1/00*    (2006.01)

(52) U.S. Cl. ..................... 327/544; 713/322
(58) Field of Classification Search ............. 713/321, 713/320, 322, 324; 307/149; 327/565, 544, 327/548
See application file for complete search history.

(56) References Cited

U.S. PATENT DOCUMENTS

| | | | |
|---|---|---|---|
| 5,586,308 | A | 12/1996 | Hawkins et al. |
| 5,825,674 | A * | 10/1998 | Jackson ............... 713/321 |
| 6,067,627 | A * | 5/2000 | Reents ............... 713/324 |
| 6,204,651 | B1 | 3/2001 | Marcus et al. |
| 6,329,800 | B1 | 12/2001 | May |
| 6,366,522 | B1 | 4/2002 | May et al. |
| 6,404,172 | B1 | 6/2002 | May |
| 6,844,710 | B2 | 1/2005 | Lipcsei et al. |
| 6,977,447 | B2 | 12/2005 | May |
| 7,036,029 | B2 | 4/2006 | May et al. |
| 7,046,530 | B2 | 5/2006 | May |
| 7,075,280 | B2 | 7/2006 | May |
| 7,259,480 | B2 | 8/2007 | May |
| 7,278,119 | B2 | 10/2007 | Henson et al. |
| 2001/0023489 | A1 | 9/2001 | Liu et al. |
| 2004/0128575 | A1 | 7/2004 | Schmidt |

OTHER PUBLICATIONS

International Search Report and Written Opinion of International Searching Authority, International Application No. PCT/US06/40629, Mar. 10, 2008 (8 pgs).

* cited by examiner

*Primary Examiner*—Shawn Riley
(74) *Attorney, Agent, or Firm*—Toler Law Group

(57) ABSTRACT

A system includes a first semiconductor device, a second semiconductor device, and an external crystal oscillator. The first semiconductor device includes a source voltage output and an external pin input. The first semiconductor device includes a direct current-to-direct current (DC-DC) converter circuit that provides the source voltage output. The second semiconductor device includes a source voltage input that is coupled to the source voltage output of the first semiconductor device and includes a clock signal output. The external crystal oscillator is coupled via an input of the second semiconductor device to a first oscillator clock generation circuit.

31 Claims, 4 Drawing Sheets

SEMICONDUCTOR DEVICE AND SYSTEM AND METHOD OF CRYSTAL SHARING

FIELD OF THE DISCLOSURE

This disclosure relates generally to semiconductor devices and more particularly to a system and method of crystal sharing.

BACKGROUND

As is known, with advances in technology, most commercially available consumer electronic devices are being offered with more functionality at reduced costs and requiring less power. For example, electronic devices such as portable AM/FM radios, personal multimedia entertainment systems, CD/DVD/MP3 players, cellular phones, and the like are becoming more cost effective and compact. Typically these electronic devices include semiconductor components, such as processors, memory chips, input/output circuits, and the like, that process data to achieve a desired output. Most of these portable electronic devices are battery powered and often consume power whether they are processing data or not.

Many of these portable electronics devices are being offered as customized products for individual customers. For example, some consumers purchase digital MP3 players without a built-in AM/FM radio, whereas others prefer an MP3 player with an integrated AM/FM radio. As a manufacturer of MP3 players, it may be desirable to develop a common base product that has a reduced component count and that is independent of optional features, such as the integrated AM/FM radio.

Accordingly, there is a need for improved semiconductor devices and systems and methods of supplying signals to components and/or modules within the semiconductor devices.

DETAILED DESCRIPTION OF DRAWINGS

The present disclosure provides tools and techniques for supplying signals, such as clock and voltage signals, to components and/or modules within semiconductor devices. In a system and method for sharing a clock signal and a voltage supply signal between semiconductor devices, a first semiconductor device detects a presence of power and provides an external clock enable input to a second semiconductor device, which is external and separate from the first device. The first device includes an internal clock that is provided to a direct current to direct current (DC-DC) converter circuit to generate voltage signals. At least one voltage signal of the DC-DC converter circuit that exceeds a threshold is provided to the second device. The second semiconductor device provides an external clock signal to the first semiconductor device after receiving the at least one voltage signal. The first device switches from the internal clock to the external clock signal after it receives the external clock signal.

The disclosed method and system provides an improved technique for sharing clock and voltage supply signals between semiconductor devices. The sharing technique reduces component count, and hence cost, by sharing components such as a crystal oscillator, a DC-DC converter, and a battery. The sharing technique is also advantageously independent of optional components that may be included within the semiconductor devices.

The functionality of various systems, modules, circuits, devices or components described herein may be implemented as hardware (including discrete components, integrated circuits, and systems-on-a-chip, and the like), firmware (including application specific integrated circuits, programmable chips, and the like) and/or software or a combination thereof, depending on the application requirements.

Figure 1:
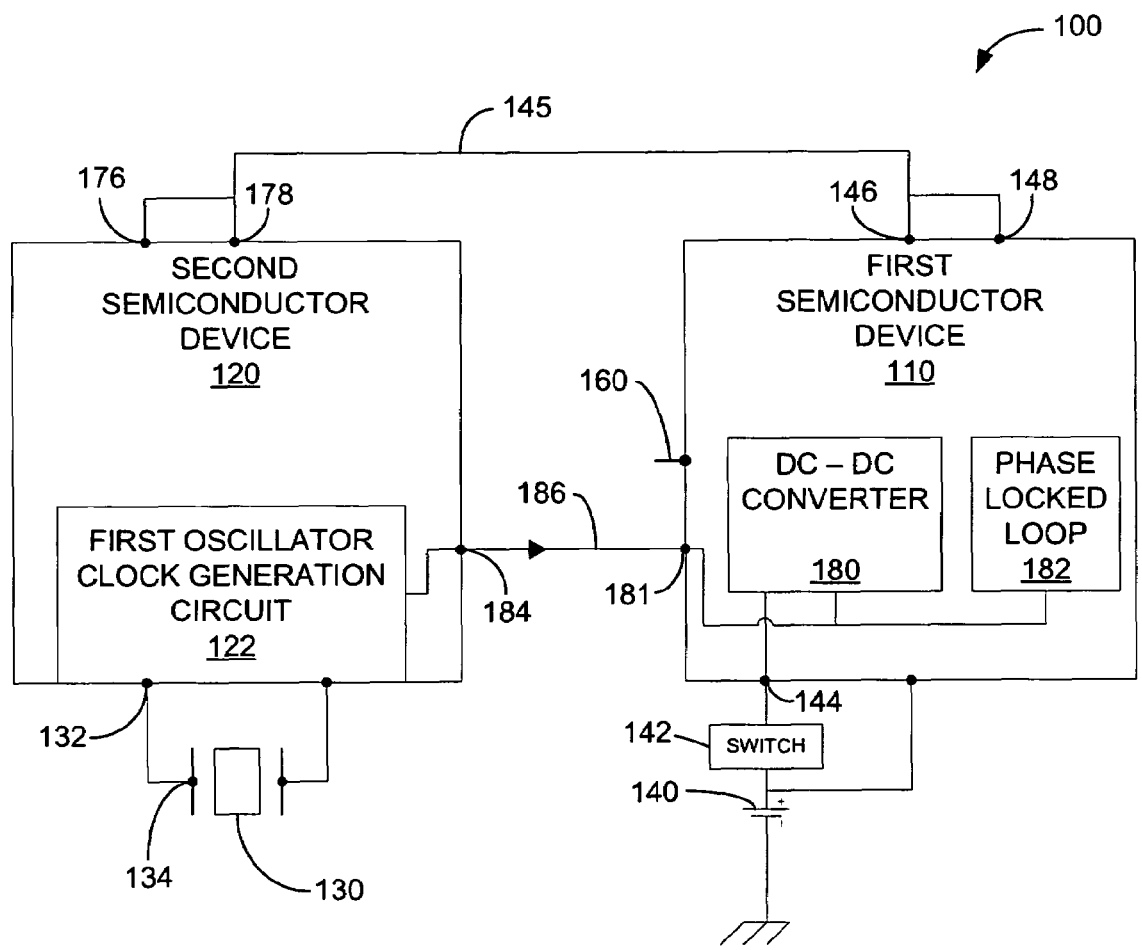
FIG. 1 illustrates a schematic block diagram of a system having two semiconductor devices for sharing clock and voltage supply signals.

FIG. 1 illustrates a schematic block diagram of a system 100 having two semiconductor devices for sharing clock and voltage signals, according to an illustrative embodiment. In the depicted embodiment, the system 100 includes a first semiconductor device 110, a second semiconductor device 120 and an external crystal oscillator 130 that is directly coupled to the second semiconductor device 120. The system 100 is operable to perform at least one predefined function. The second semiconductor device 120 is external and separate from the first semiconductor device 110. The designation as a first or second device is for illustration and may be interchangeable.

In a particular embodiment, the first semiconductor device 110 is an MP3 chip operable to record/play digital audio signals in the MP3 format. Other devices to process similar well-known audio/video compression formats, such as JPEG and MPEG are also contemplated. The second semiconductor device 120 is a frequency modulation (FM) device operable to receive radio frequency signals such as FM radio signals. In one embodiment, the system 100 may be implemented as a system-on-a-chip (SoC). In one particular embodiment, the first semiconductor device 110 and the second semiconductor device 120 may be included in a single package.

In another embodiment, the system 100 may be configured and deployed with or without the second semiconductor device 120. That is, the system 100 may be configured to optionally support FM radio reception in addition to the MP3 player operation.

In the depicted embodiment, the first semiconductor device 110 may be coupled to a power/voltage source 140, such as a battery. The source 140 provides current to the first device 110 via a power source input 144. A pswitch 142 coupled to the input 144 may be used to detect a high signal indicating start of a power up process. A direct current to direct current (DC-DC) converter 180 included in the first device 110 receives power from the source 140 and converts the received supply voltage to other voltage levels that may be suitable for other internal components within the devices.

The first device 110 also includes at least one voltage output for providing a power/voltage signal to other devices, such as the second device 120. In the depicted embodiment, the first device 110 includes a first source voltage output ($V_{DD}$) 146 and a second source voltage output ($V_{DDIO}$) 148 for providing power/voltage signals 145 to the second device 120 via a first source voltage input ($V_{DD}$) 176 and a second source voltage input ($V_{DDIO}$) 178, respectively. Specific voltage values selected for $V_{DD}$ 146 and $V_{DDIO}$ 148 may vary based on the application requirements. In one embodiment, a threshold value for $V_{DD}$ 146 may be nominally set at 1.5 volts, and for $V_{DDIO}$ 148 the voltage may be nominally set at 3 volts. The DC-DC converter 180 may be described to be operating in a normal or power-OK mode when at least one of the voltage supply outputs is above the threshold.

In the depicted embodiment, the first semiconductor device 110 includes an external pin input 160 that floats as shown. The external pin input 160 may be coupled to an external crystal oscillator to receive a clock signal when the second semiconductor device 120 is not present. An external pin input 181 of the first device 110 is coupled to an external clock signal output 184 of the second semiconductor device 120 to receive an externally generated clock signal 186.

In the depicted embodiment, the second device 120 provides the clock signal 186 responsive to detecting power at the second source voltage inputs 176 and 178. In one embodiment, the external crystal oscillator 130 is used by the second device 120 to generate the external clock signal 186, which is transmitted to the first device 110 via the pin input 181. During an initial phase of generating the clock signal 186, the second device 120 includes logic to hold the external clock signal output to a low state until a valid voltage supply signal is detected.

In the depicted embodiment, the second device 120 includes a first oscillator clock generation circuit 122 to receive a generated clock signal 134 from the external crystal oscillator 130 at an external crystal oscillator input 132. In one embodiment, the generated clock signal 134, or a signal derived therefrom, is the external clock signal 186. Responsive to detection of the supply voltage, the first oscillator clock generation circuit 122 provides the external clock signal 186 to the external pin input 181 of the first semiconductor device 110.

In a particular embodiment, the system 100 may be configured to include the first semiconductor device 110 without the second semiconductor device 120. For example, when an FM radio option is not selected, the system 100 may include the first semiconductor device 110. In this embodiment, an output 134 of the external crystal oscillator 130 may provide the external clock signal 186 directly to the first device 110. The external clock signal 186 is transmitted to the first device 110 via the external pin inputs 160 and 181.

The external clock signal 186 received by the first device 110 may be routed internally to other components and/or modules within the first device 110, such as to a phase locked loop (PLL) module 182 and/or to the DC-DC converter 180.

Figure 2:
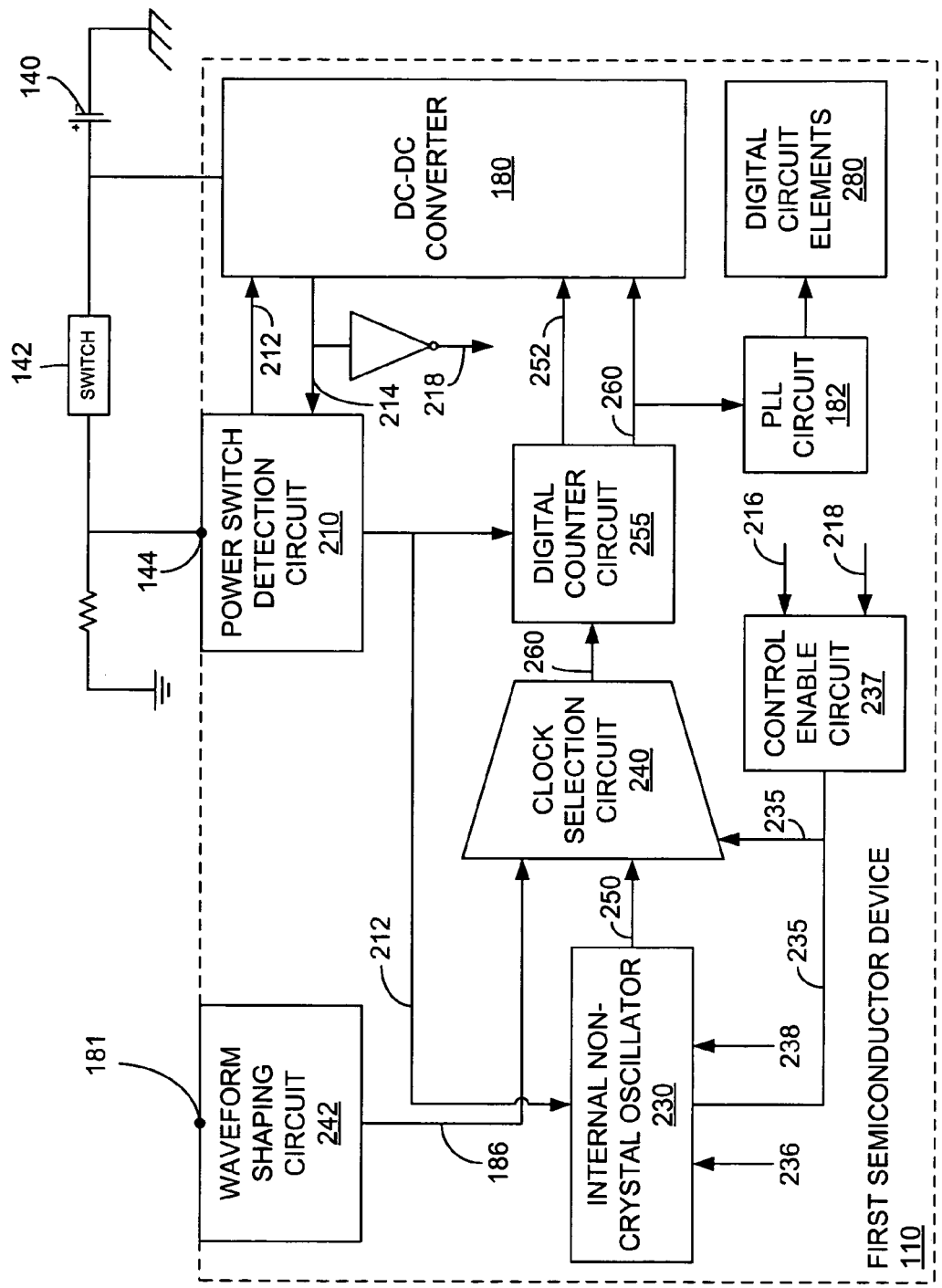
FIG. 2 is a schematic block diagram illustrating further details of a particular embodiment of the system of FIG. 1.

FIG. 2 is a schematic block diagram illustrating further details of an illustrative embodiment of the first semiconductor device 110 of FIG. 1. In the depicted embodiment, the first semiconductor device 110 includes a power switch detection circuit 210 operable to receive power from the power source 140. The power switch detection circuit 210 may detect a presence of power by several techniques such as detecting an assertion of a pswitch at an input pin and/or by detecting a change in the incoming current. The power switch detection circuit 210 may be implemented as a buffer that receives a pswitch pin voltage as an input. In response, the power switch detection circuit 210 provides a start power output signal 212 to initiate a power-on sequence at the DC-DC converter 180, and to initiate an internal clock enable to an internal non-crystal oscillator 230 and to a digital counter circuit 255. The power-on sequence for the DC-DC converter 180 may include a series of steps to provide that the first source voltage output ($V_{DD}$) 146 and the second source voltage output ($V_{DDIO}$) 148 are above the predefined threshold voltage level. Once the power-on sequence is complete, the power switch detection circuit 210 receives a power-OK input 214 from the DC-DC converter 180 when at least one of the supply voltages of the DC-DC converter 180 exceeds the threshold.

The internal non-crystal oscillator 230, such as a resistor-capacitor (RC) oscillator, is less costly than a crystal oscillator and is operable to generate an internal clock signal 250 after the DC-DC converter 180 receives the start power output signal 212. A clock selection circuit 240 and the digital counter circuit 255, during a startup phase, pass the internal clock signal 250 through to the DC-DC converter 180 for use during the power-on sequence. The internal non-crystal oscillator 230 receives a control input 235, a current reference 236, and a voltage reference 238 for controlling its operation.

In a particular embodiment, control enable circuit 237 receives a first input 216 that detects a presence of the second device 120 and receives a second input 218 that is the inverse of the power-OK input 214. In a particular embodiment, the first input signal 216 may be provided in response to detection of current or voltage at the interface 146 or 148 to the second device 120. The control enable circuit 237 generates the control input 235 in response to receiving the first input 216 and receiving the second input 218. That is, the operation of the internal non-crystal oscillator 230 may be enabled when the second device 120 is present and when the power-OK input 214 is not asserted. Alternatively, the internal non-crystal oscillator may be activated in response to the inverse 218 of the power OK signal 214, without the control enable circuit 237. The operation of the internal non-crystal oscillator 230 is disabled after receiving the external clock signal 186 and the power-OK input 214. Additional details of a particular embodiment of the internal non-crystal oscillator 230 are described with reference to FIG. 4.

The clock selection circuit 240 receives the internal clock signal 250 and the external clock signal 186 at its inputs. In one embodiment, the waveform of the external clock signal 186 transmitted from the external clock signal output 181 may be enhanced by a waveform shaping circuit 242 to make it suitable for further processing.

In one embodiment, the clock selection circuit 240 is implemented as a synchronous multiplexer operable to select an input responsive to the control input 235. That is, the clock selection circuit 240 is operable to selectively provide either the internal clock signal 250 or the external clock signal 186 to the DC-DC converter 180 as a selected clock signal 260. Therefore, the selected clock signal 260 is the internal clock signal 250 during the power-on sequence and the selected clock signal 260 is the external clock signal 186 shortly after the completion of the power-on sequence, which is indicated by the power-OK input 214.

In the depicted embodiment, the digital counter circuit 255 receives the selected clock signal 260 as an input and substantially passes it through to the DC-DC converter 180. The digital counter circuit 255 also provides an enable switching output 252 to the DC-DC converter 180 for regulating its operation.

Figure 3:
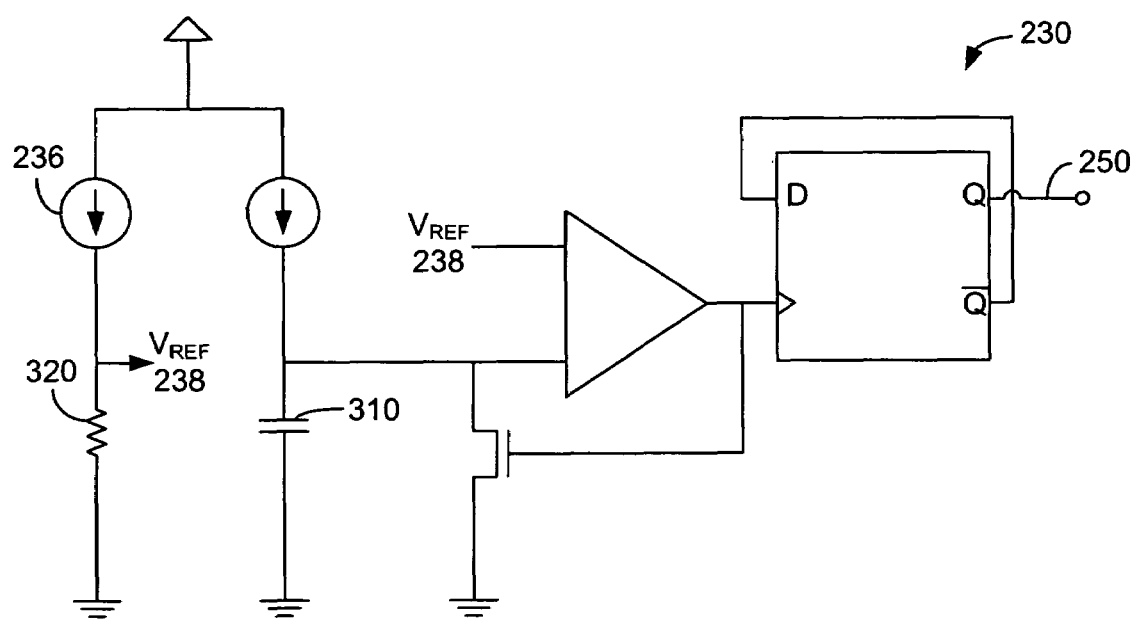
FIG. 3 is a schematic circuit diagram illustrating further details of a local oscillator of FIG. 2.

FIG. 3 is a schematic circuit diagram illustrating further details of the internal non-crystal oscillator 230 described in FIG. 2, according to an illustrative embodiment. In the depicted embodiment, the internal non-crystal oscillator 230 utilizes a low voltage band gap to define the current reference 236 and the voltage reference 238. A half period $T_H$ of the internal clock signal 250 is a function of a capacitor 310, a resistance 320, the voltage reference 238, the current reference 236 and a time delay $T_D$ of the comparator and is expressed by equation 300 below.

$$T_H = (C \cdot V_{REF})/(I_0/R) + T_D \qquad \text{Equation 300}$$

Figure 4:
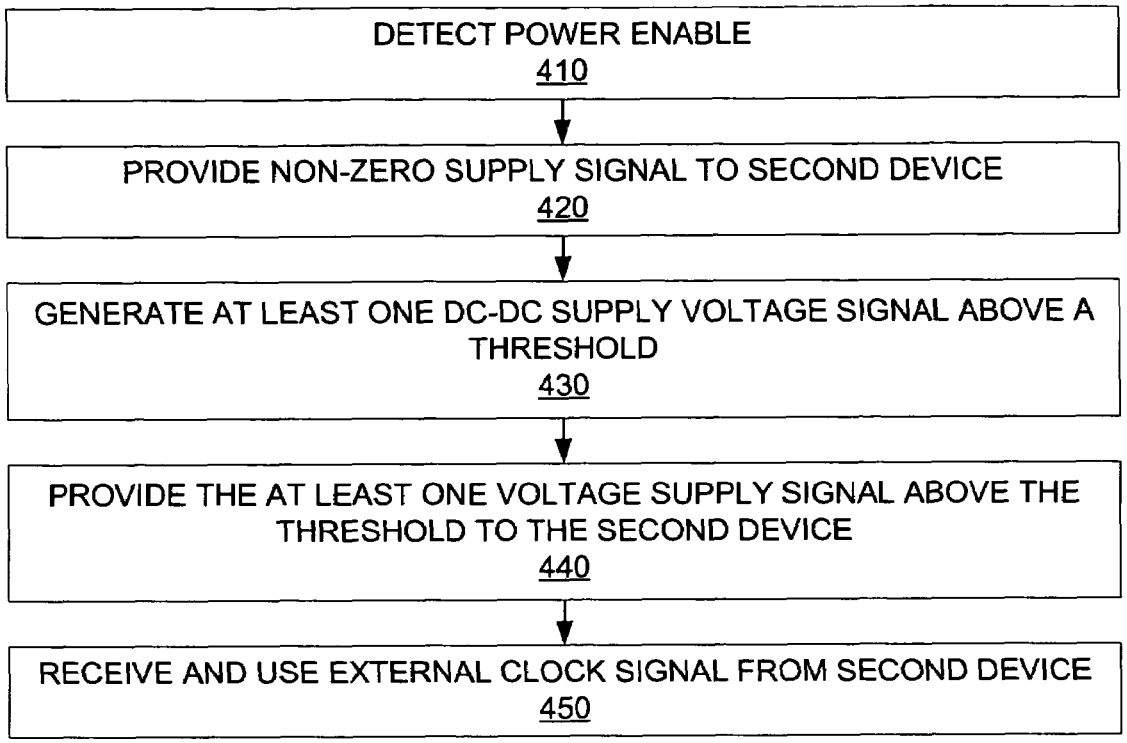
FIG. 4 is a flow chart illustrating a method of supplying a voltage and clock signal to a semiconductor device of FIG. 1.

FIG. 4 is a flow chart illustrating a method of supplying a voltage and a clock signal to a semiconductor device. At step 410, an assertion of a power enable signal, such as a high input on a pswitch pin is detected at a first semiconductor device, such as the semiconductor device 110 of FIG. 1. As another example, an insertion of a power source such as a battery coupled to the first semiconductor device may be detected. At step 420, a non-zero supply signal is provided to a second semiconductor device (such as device 120) in response to the assertion of the power enable signal. At step 430, the first device goes through a power-on sequence, which results in generating at least one DC-to-DC voltage supply signal that is above a predefined threshold. At step 440, the at least one voltage supply signal above the threshold is provided to the second device. At step 450, the first device receives and uses an external clock signal (such as clock signal 186) from the second semiconductor device in response detection of the at least one voltage supply. The external clock signal may be provided to other components (such as the PLL circuit 182) within the first semiconductor device.

Various steps described above may be added, omitted, combined, altered, or performed in different orders. For example, steps 440 and 450 may be deleted if the second device is absent.

Figure 5:
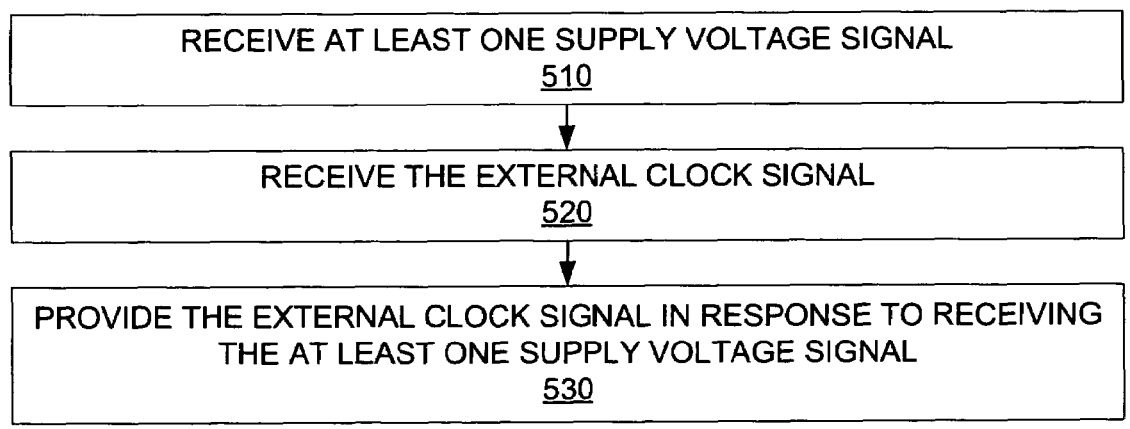
FIG. 5 is a flow chart illustrating a method of sharing a clock and voltage between semiconductor devices of FIG. 1.

FIG. 5 is a flow chart illustrating a method of sharing a clock and voltage signal between semiconductor devices. At step 510, at least one voltage supply signal is received by a second semiconductor device. The power signal is provided by the first semiconductor device, which may be external to and separate from the second semiconductor device. Alternatively, the first semiconductor device and the second semiconductor device may be in the same package. At step 520, the second semiconductor device receives an externally generated clock signal provided by an external crystal oscillator coupled to the second device. At step 530, an externally generated clock signal derived from the external crystal oscillator is provided by the second device to the first device in response to the second device detecting that the at least one voltage supply signal that is above a threshold.

Various steps described above may be added, omitted, combined, altered, or performed in different orders. For example, step 520 may be deleted if the external clock signal is generated by embedding the external crystal oscillator in the second device.

For purposes of this disclosure, the disclosed system may include any instrumentality or aggregate of instrumentalities operable to perform functions such as transmit, receive, compute, classify, process, retrieve, originate, switch, store, display, manifest, detect, record, reproduce, handle, or utilize any form of information, intelligence, or data for consumer, business, scientific, control, or other purposes. For example, the system 100 may be implemented as one or more integrated circuits, a printed circuit board, a processor, or any other suitable device and may vary in size, shape, performance, functionality, and price.

Although illustrative embodiments have been shown and described, a wide range of modification, change and substitution is contemplated in the foregoing disclosure and in some instances, certain features of the embodiments may be employed without a corresponding use of other features. For example, while certain aspects of the present disclosure have been described in the context of the system 100 including one or more semiconductor devices, those of ordinary skill in the art will appreciate that the processes disclosed are capable of being implemented using discrete components.

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present invention.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a first semiconductor device having a source voltage output and an external pin input, the first semiconductor device including a direct current to direct current (DC-DC) converter circuit that provides the source voltage output;
   a second semiconductor device having a source voltage input coupled to the source voltage output of the first semiconductor device and having a clock signal output wherein the clock signal output is coupled to the external pin input of the first semiconductor device; and
   an external crystal oscillator coupled via an input of the second semiconductor device to a first oscillator clock generation circuit.

2. The system of claim 1, wherein the DC-DC converter circuit is selectively coupled to receive a clock signal from one of an internal clock generator circuit and an external clock signal; and wherein the first oscillator clock generation circuit is coupled to provide the external clock signal to the external pin input of the first semiconductor device.

3. The system of claim 2, wherein the internal clock generator circuit provides an internal clock signal to the DC-DC converter.

4. The system of claim 1, wherein the first semiconductor device is coupled to a battery.

5. The system of claim 1, wherein the first semiconductor device has a second source voltage output.

6. The system of claim 1, wherein the clock signal output of the second semiconductor device is provided to the external pin input of the first semiconductor device after a detected voltage supply exceeds a threshold.

7. The system of claim 1, wherein a clock selection circuit in the first semiconductor device selects the external clock signal output transmitted from the second device.

8. The system of claim 7, wherein the clock selection circuit includes a synchronous multiplexer operable to toggle between a first input received from the internal clock generator circuit and a second in put responsive to the external clock signal output of the second semiconductor device, and wherein a digital counter is interposed between the DC-DC converter circuit and the clock selection circuit.

9. The system of claim 1, wherein the first semiconductor device is an MP3 device and the second semiconductor device is a frequency modulation (FM) device.

10. The system of claim 1, wherein the first semiconductor device is operable without the second semiconductor device, and wherein an output of the external crystal oscillator is directly coupled to the external pin input.

11. The system of claim 1, wherein a single external crystal oscillator device is shared between the first and the second semiconductor devices.

12. A semiconductor device comprising:
a power source input;
a source voltage output;
an internal non-crystal oscillator having an internal clock signal output;
a direct current to direct current (DC-DC) converter that provides the source voltage output in response to receiving power from the power source input;
an external pin input to receive an external clock signal; and
a clock selection circuit to selectively provide one of the internal clock signal and the external clock signal as a clock signal input to the DC-DC converter.

13. The device of claim 12, wherein an external crystal oscillator is used to provide the external clock signal.

14. The device of claim 13, wherein the external crystal oscillator is shared by a second semiconductor device that is directly coupled to the external crystal oscillator.

15. The device of claim 12, wherein the external clock signal is provided in response to the source voltage output being above a threshold.

16. The device of claim 12, further comprising a power detector circuit coupled to the power source input to detect a high input on a switch pin, to initiate a power-on sequence at the DC-DC converter, and to initiate activation of the internal non-crystal oscillator, wherein a power-OK signal is provided by the DC-DC converter after the source voltage output of the DC-DC converter exceeds a threshold.

17. The device of claim 12, wherein the clock selection circuit selectively toggles between the internal clock signal and the external clock signal.

18. The device of claim 12, wherein the semiconductor device is an MP3 device.

19. A semiconductor device comprising:
a source voltage input;
an external crystal oscillator input;
a clock signal output; and
an oscillator clock generation circuit to provide a generated clock signal to the clock signal output after the source voltage input is above a threshold.

20. The device of claim 19, wherein the external crystal oscillator input is coupled to an external crystal oscillator and wherein the generated clock signal is provided to another semiconductor device.

21. The device of claim 19, wherein the semiconductor device is a frequency modulation (FM) device.

22. A method of supplying a voltage to a semiconductor device, the method comprising:
detecting an assertion of a power up signal at a first semiconductor device;
detecting availability of at least one voltage signal being above a threshold at the first semiconductor device;
providing the at least one voltage signal to a second semiconductor device that is separate from the first semiconductor device;
receiving an external clock signal from the second semiconductor device after providing the at least one voltage signal.

23. The method of claim 22, further comprising:
providing the external clock signal to a phase lock loop (PLL) circuit within the first semiconductor device.

24. The method of claim 22, further comprising:
starting an internal oscillator to provide an internal clock signal to a direct current to direct current (DC-DC) converter circuit before receiving the external clock signal.

25. The method of claim 22, further comprising:
switching from an internal clock signal to the external clock signal after detecting that the at least one voltage signal is above the threshold.

26. The method of claim 22, further comprising:
detecting an insertion of a battery that is coupled to the first semiconductor device, wherein the insertion of the battery causes the assertion of the power up signal.

27. A method of sharing a clock and voltage between semiconductor devices, the method comprising:
receiving at least one voltage signal at a second semiconductor device, wherein the at least one voltage signal is provided by a first semiconductor device that is external and separate from the second semiconductor device;
receiving an external clock signal provided by an external crystal oscillator; and
providing a clock signal derived from the external clock signal to the first semiconductor device after the at least one voltage signal is above a threshold.

28. The method of claim 27, wherein the first semiconductor device is an MP3 device and the second semiconductor device is a frequency modulation (FM) device.

29. A method comprising:
receiving at least one supply voltage signal at a semiconductor device, the semiconductor device including an internal clock generator to provide an internal clock signal;
receiving an external clock signal at a clock input of the semiconductor device, wherein in a first mode, the external clock signal is received from a crystal oscillator coupled to the clock input, and wherein in a second mode, the external clock signal is received from a second semiconductor device coupled to the clock input; and
selectively providing the external clock signal and the internal clock signal to circuitry of the semiconductor device in response to receiving the external clock signal.

30. The method of claim 29, wherein the semiconductor device includes a voltage supply output, and wherein the second semiconductor device is responsive to a supply voltage at the voltage supply output of the first semiconductor device.

31. The method of claim 29, wherein selectively providing the external clock signal and the internal clock signal comprises:
providing the internal clock signal when a power OK signal is not asserted at a clock selection circuit of the semiconductor device; and
providing the external clock signal when the external clock signal is received and when the power OK signal is asserted at the clock selection circuit.

* * * * *